(12) United States Patent
De La Maza Uriarte

(10) Patent No.: US 9,163,920 B2
(45) Date of Patent: Oct. 20, 2015

(54) DISMOUNTABLE NUMERICAL CONTROL MACHINE

(71) Applicant: UNIMETRIK, S.A., Legutiano (ES)

(72) Inventor: Borja De La Maza Uriarte, Getxo (ES)

(73) Assignee: UNIMETRIK, S.A., Legutiano, Alava (ES)

( * ) Notice: Subject to any disclaimer, the term of this patent is extended or adjusted under 35 U.S.C. 154(b) by 268 days.

(21) Appl. No.: 13/956,648

(22) Filed: Aug. 1, 2013

(65) Prior Publication Data

US 2014/0340693 A1 Nov. 20, 2014

(30) Foreign Application Priority Data

May 16, 2013 (ES) .................................. 201330701

(51) Int. Cl.
*G01B 5/008* (2006.01)
*G01B 21/04* (2006.01)
*G05B 19/00* (2006.01)

(52) U.S. Cl.
CPC ............... *G01B 5/008* (2013.01); *G01B 21/04* (2013.01); *G05B 19/00* (2013.01)

(58) Field of Classification Search
CPC ....... G01B 5/008; G01B 11/005; G01B 21/04
USPC .................................................. 33/1 M, 503
See application file for complete search history.

(56) References Cited

U.S. PATENT DOCUMENTS

| 4,133,112 A | * | 1/1979 | Matthiessen ................... 33/1 M |
| 5,131,166 A | | 7/1992 | Weber |
| 7,246,030 B2 | | 7/2007 | Raab et al. |
| 7,779,549 B2 | | 8/2010 | Garau |
| D643,319 S | | 8/2011 | Ferrari et al. |
| D659,035 S | | 5/2012 | Ferrari et al. |

FOREIGN PATENT DOCUMENTS

| CN | 202669340 | 1/2013 |
| EP | 0916922 | 5/1999 |
| ES | 2185431 | 4/2003 |
| ES | 2328736 | 11/2009 |
| ES | 2339150 | 5/2010 |
| WO | WO02/27269 | 4/2002 |

\* cited by examiner

*Primary Examiner* — R. A. Smith
(74) *Attorney, Agent, or Firm* — Notaro, Michalos & Zaccaria P.C.

(57) ABSTRACT

Dismountable numerical control machine which comprises a first longitudinal bedplate (1), a base (2), a column (3) attached to the base (2), a secondary carriage or crosspiece (4) and an arm (5), in which the principal carriage or base (2) moves horizontally along the longitudinal bedplate (1), while the secondary carriage or crosspiece (4) can move vertically in relation to the column (3); and in which, also, the arm (5) can be moved horizontally in relation to the crosspiece (4), and which also comprises a transport tool (6) configured as an auxiliary longitudinal bedplate placed adjacent to the principal bedplate (1).

10 Claims, 3 Drawing Sheets

DISMOUNTABLE NUMERICAL CONTROL MACHINE

The object of this invention is a numerical control (CNC) machine with automatic scanning and which can be dismantled for easy movement, maintaining optimum characteristics of high-precision three dimensional digitising.

STATE OF THE ART

Currently there are no portable and/or dismountable automatic scanning CNC machines based on a system of three Cartesian axes allowing precise and automatic three-dimensional digitisation. The portable machines available on the market are basically hand-operated machines which are, consequently, neither automatic nor motorised, such as portable arms (FARO) or GOM-type fringe projection systems such as, for example, those described in documents U.S. Pat. No. 7,779,549, ES 2 185 431, U.S.D659035 U.S.D643319 U.S. Pat. No. 7,246,030 and U.S. Pat. No. 5,131,166.

The document ES 2 328 736 T3 is considered to be the state of the art closest to this invention. However, in this document, the machine is folded for transport by leaning the upright onto the base, which complicates assembly and dismantling, given that screws (or other equivalent types of connector) joining the upright to the base have to be removed, and others have to be left in to act as a hinge for the folding.

Other documents with folding systems are CN202669340U, but in this case the bedplate is firmly fixed, complicating the assembly and dismantling, apart from the fact that the machine itself is completely different. Finally, documents ES2339150T3, WO0227269 and EP0916922 refer to dismountable CNC machines which are totally different from the one described in this invention.

DESCRIPTION OF THE INVENTION

With the aim of solving the technical problem indicated, this invention describes a dismountable automated and motorised 3D scanning CNC machine for high definition 3D scanning. The components and structure of the machine are designed to make it easier to assemble and dismantle the machine, and also to move it, while at the same time maintaining and guaranteeing its high precision when scanning parts and surfaces. This motorised and automated 3D scanning machine can be moved and installed in the desired location thanks to a series of simple steps for its assembly and start-up, ensuring precision 3D digitising.

More specifically, this invention comprises a scanning machine with 3 Cartesian axes, a 3D scanning sensor which can be coupled to said machine, and control equipment and software to control the movement of the system and perform the 3D digitising.

The machine with three Cartesian axes comprises a longitudinal bedplate, a base, a column, a crosspiece, an arm and a transport tool, designed in such a way that they can be dismantled so that the longitudinal bedplate, the base, the column and the crosspiece fold onto the transport tool, while the arm is stored directly in a transport case. Each of the machine's components has the elements necessary to move and control it, such as motors, bearing raceways, reader rules and other elements necessary to carry out its function. Meanwhile, the scanning sensor has a support piece which allows it to be coupled to the arm and quick and easy assembly.

The system has the necessary wiring for the connection of a variety of equipment and systems, characterised in that it has easily identifiable connectors to prevent erroneous connection of the systems.

Finally, the whole is completed with a transport case designed to store and transport safely and comfortably the abovementioned elements and accessories, such as wiring. The control case is designed to house and transport safely and comfortably the equipment designed to control the movement of the machine, the 3D scanning sensor and the equipment which performs the tasks involved in 3D scanning.

Throughout the description and the claims, the word "comprises" and variants thereof are not intended to exclude other technical characteristics, additions, components or steps. For experts in the subject, other objects, advantages and characteristics of the invention will be gleaned in part from the description and in part from the practice of the invention. The following examples and drawings are provided for illustrative purposes, and are not intended as a restriction on this invention. In addition, this invention covers all the possible combinations of particular and preferred embodiments indicated here.

BRIEF DESCRIPTION OF THE FIGURES

Below is a very brief description of a series of drawings which help to understand the invention better and which are expressly related to an embodiment of said invention presented as a non-restrictive example thereof.

PRESENTATION OF A DETAILED MODE OF EMBODIMENT OF THE INVENTION

Figure 1:
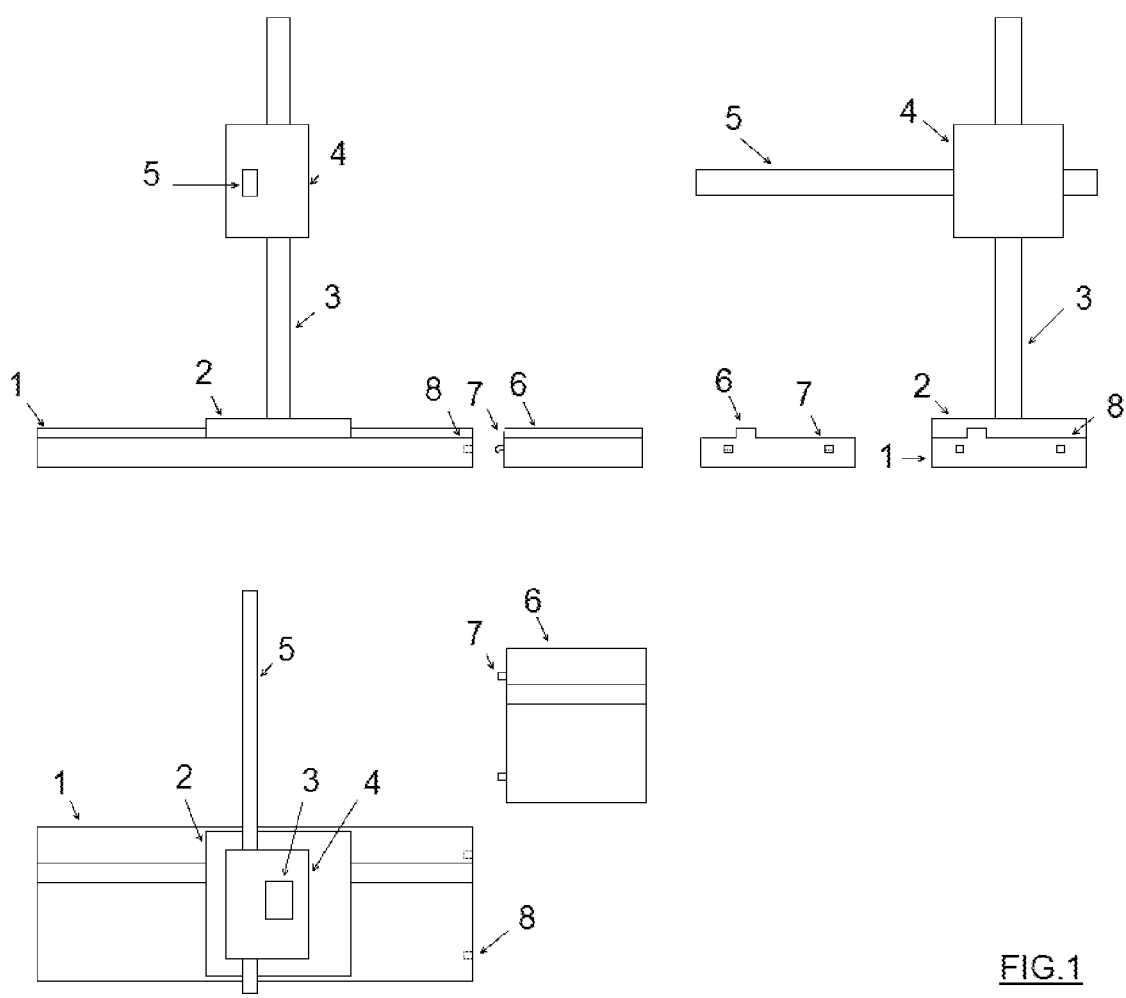
FIG. 1.—Shows different views of the machine which is the object of this invention.
Figure 2:
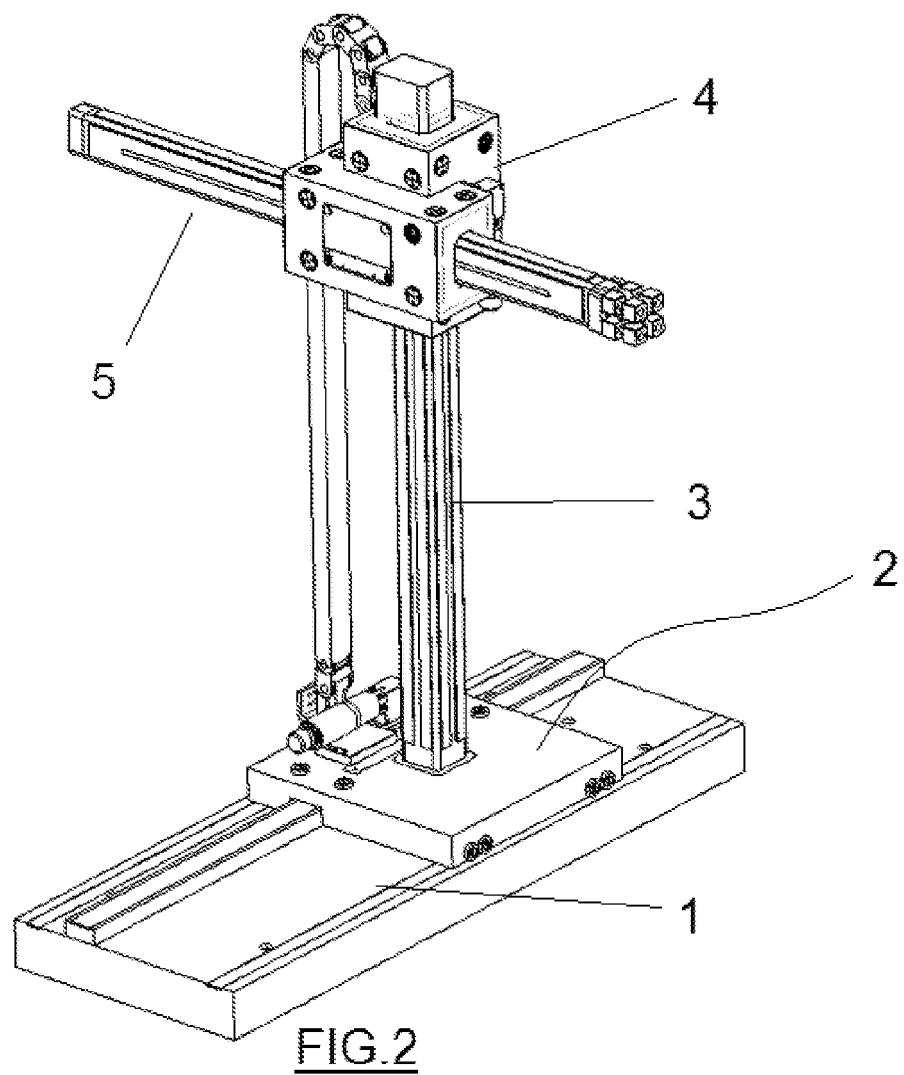
FIG. 2.—Shows a view of the machine which is the object of this invention assembled.
Figure 3:
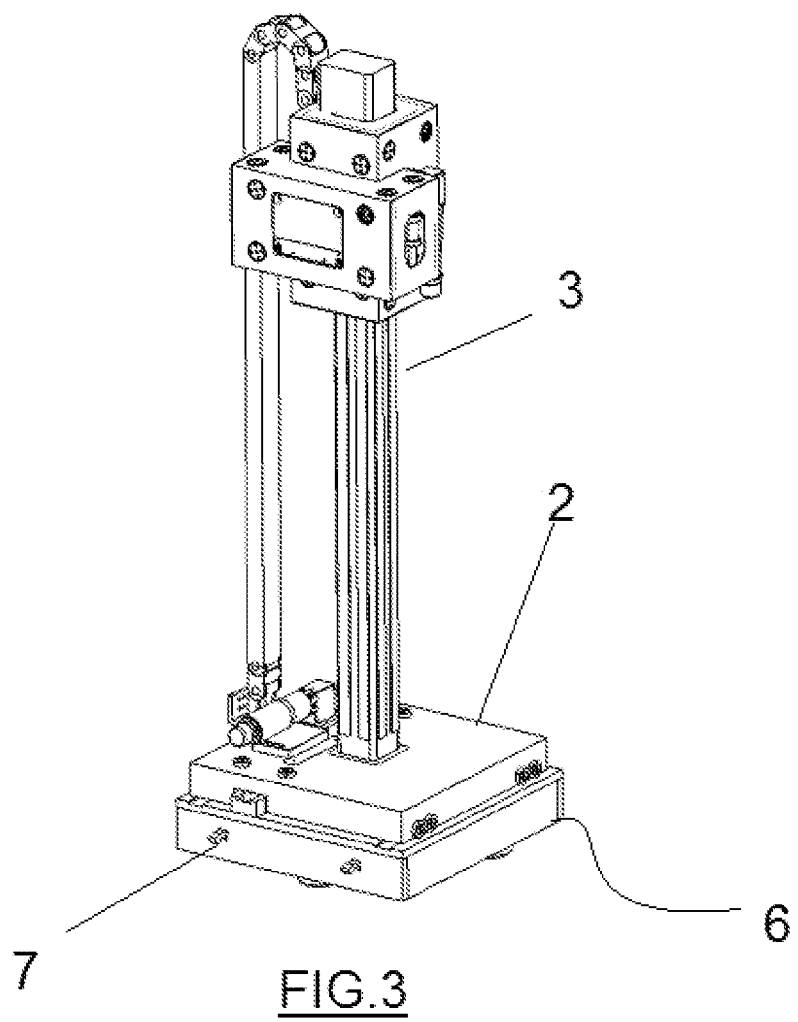
FIG. 3.—Shows a view of the machine which is the object of this invention dismantled.

As can be seen in the attached figures, the machine which is the object of this invention comprises a first longitudinal bedplate (1), a principal carriage or base (2), a column (3) attached to the base (2), a secondary carriage or crosspiece (4) and an arm (5); in such a way that the principal carriage or base (2) moves along the longitudinal bedplate (1) horizontally, while the secondary carriage or crosspiece (4) can be moved vertically in relation to the column (3); and where, in addition, the arm (5) can, in turn, be moved horizontally in relation to the crosspiece (4).

Meanwhile, the machine is completed with a transport tool or auxiliary bedplate (6), which is a longitudinal bedplate placed adjacent to the principal bedplate (1) when the machine is being moved and on which the machine rests during this operation.

The 3D scanning machine is configured with a system of three Cartesian axes. Consequently, the movement of the secondary carriage (4) is along the Z axis of the machine, while movement of the arm (5) is along the machine's Y axis and the base (2) moves in relation to its X axis. The machine's three axes (X, Y, Z) move independently of each other, allowing the scanning sensor to move automatically within the measuring volume. This measuring volume is a parallelepiped and the length of its sides depends on the movements of the machine's axes.

The automatic, flexible and dismountable high definition 3D scanning machine includes, together with the Cartesian three axis machine, the 3D scanning sensor and its supporting piece or block, and the control equipment necessary to manage the movements and the 3D scanning. The scanning software and the three-axis CNC control allow the dismountable scanning machine to be operated controlling at all times the position and movement of the three axes and the orientation of the scanning sensor, while also managing the other operating parameters, thereby allowing high precision scanning. The system for movement along the axes thus comprises the motors, reduction and angle adjustment systems, and friction traction systems (pulley-guide on the X axis, and fixed axes-bearing raceways on Y-Z axes) necessary to move them. The machine is completed with a system for reading the position of the axes: the optical scale and reader head.

Meanwhile, referring to the principal parts of the machine, the longitudinal bedplate (1) is the support along which the base (2) or principal carriage moves (the machine's X axis), with inserts in bearing raceways, guide and bushing for level regulation. The guide for the X axis is located on the upper part of the bedplate (1), and is of the same length. The X axis reader rule is located on the upper part of the guide. The bedplate (1) has connecting sleeves (8) on its side, into which the transport tool (6) inserts (7) fit.

The principal carriage or base (2) allows the machine to move along the X axis. It consists of a base which slides along the principal bedplate (1) and a column (3) with bearing raceways attached to it. The principal carriage (2) has eight sets of axles with bearings which roll on the bearing raceways located on the upper part of the bedplate (1) and four sets of axles with bearings on the guide. The reader head of the coordinate on the X axis is located at the rear of the base (2). The optical scale for reading the coordinate of the Z axis is located on one of the sides of the column (3).

The secondary carriage or crosspiece (4) consists of a body which is mounted on the column (3) and which houses the arm (5) of the machine, allowing movement along the column (3) on the Z axis; consequently, its movement is along the Z axis of the machine reference system. The movement of the crosspiece (4) is supported on bearings which move along eight bearing raceways which are close to the column (3), thus ensuring a high precision movement.

The motor system for the Z axis is located on the rear of the crosspiece (4), providing movement for the crosspiece (4) with a system of friction using a fixed axle and aided by a counterbalancing system. The Z axis reader head is inside the crosspiece (4).

The arm (5) provides the machine with movement on the Y axis by moving within the crosspiece (4) where it is housed, in an orthogonal direction to the column (3) and the bedplate (1). The movement of the arm (5) in the crosspiece (4) is supported on bearings which move along eight bearing raceways which are close to the arm (5), which in a particular embodiment is made of carbon fibre, though other materials are not excluded.

The tracks of the arm (5) ensure high precision in the movement. The Y axis reader rule is attached along the length of the arm (5) and the reader head is inside the crosspiece (4). The laser sensor is attached to the end of the arm (5) by means of a support piece or block.

Finally, the transport tool or auxiliary bedplate (6) is a longitudinal bedplate placed adjacent to the principal bedplate (1) for dismantling and assembly of the machine. During transport, the set of base (2), column (3) and crosspiece (4) of the machine rest on the auxiliary bedplate (6). To ensure it is positioned correctly, there are inserts (7) which fit into the connecting sleeves (8) of the principal bedplate (1).

The machine is completed with a 3D scanning sensor and support piece or block coupled to the arm (5) for positioning of the sensor and the control equipment for motorisation and automation of the scanning system, which include:
  3-axis CNC on the machine to control the movement of the 3D sensor within the scanning volume.
  High performance PC with 3D scanning software.
  Wiring for the connection of motors, reader heads, support piece and 3D scanning sensor with the 3-axis CNC and high performance PC, with their corresponding labels or identifying colours for quick and easy connection.
  Transport case for the 3-axis Cartesian machine, the 3D scanning sensor and the support piece, together with the necessary wiring and accessories.
  Control case for transport of the 3-axis CNC of the Cartesian machine and the high performance PC incorporating the automated 3D scanning software, together with the necessary wiring and accessories.

The object of the invention is to provide a machine which is easily dismountable and which, as a result, can be transported easily between two different locations. To transport the machine efficiently, once the applications have been closed and the equipment switched off, the machine must be dismantled according to the sequence described below.

Firstly, as indicated, with the applications and equipment switched off, both the PC and the three-axis CNC, and the machine remote control removed, the PC monitor must be folded so that it can be housed in the control case and the front cover of the case closed and fastened. The next step is to release the machine wiring connections at the rear of the control case, closing and fastening the rear cover.

The following stages of the process focus on dismantling the machine itself and its mechanical systems. The first step is to remove both the scanning sensor and the support piece which is used to couple it to the end of the arm (5), so that they can be housed with other accessories in the transport case. This leaves the arm (5) free to be removed from its housing in the crosspiece (4), which allows its movement on the Y axis, and stored in the transport case.

The next step is to take the transport tool (6) out of the case, place it adjacent to the longitudinal bedplate (1) and fit the inserts (7) into the connecting sleeves (8) so that they are correctly coupled. Once the stops have been removed from the longitudinal bedplate (1) and the transport tool (6), the base (2) can be moved manually, together with the column (3) and the crosspiece (4) until they are resting on the transport tool (6). Finally, the stops are positioned at both ends again, securing the position of the set of base (2), column (3) and crosspiece (4) and preventing them from moving on the transport tool (6). As a last step, the inserts (7) are removed from the connecting sleeves (8), the set of transport tool (6), base (2), column (3) and crosspiece (4) are collected, together with the CNC wiring, and placed in the transport case; the longitudinal bedplate (1) is also placed in the case, which is then closed and ready for transport.

The process for assembling the machine is similar, following the steps in reverse order. The first step is to extract the longitudinal bedplate (1) from the transport case and place it on the work surface where the machine will be installed. Once positioned, the set of transport tool (6), base (2), column (3) and crosspiece (4) is extracted and placed adjacent to the longitudinal bedplate (1), fitting the inserts (7) into the connecting sleeves (8), so that it is coupled correctly. The stops are removed from both bases so that the base (2), column (3) and crosspiece (4) can be slid to the longitudinal bedplate (1); the stops are then replaced in both bases and the inserts (7) removed from the connecting sleeves (8); the transport tool (6) is then separated and stored in the transport case. Next, the arm (5) is placed in its position, inserting it into the crosspiece (4); the scanning sensor is then coupled using the support piece at the end of the arm (5). Finally, the corresponding cables for the machine and the scanning sensor are connected.

Once the machine's mechanical components have been assembled, the control case is opened and the rest of the wiring connected to the terminals of the control equipment on the rear of the case; these terminals are identified by colour or labels to make quick assembly easier and prevent errors by identifying the correct connections. Opening the front of the control case gives access to the PC and the three-axis CNC which are used to control the 3D scanning system.

The invention claimed is:

1. Dismountable numerical control machine which comprises a first longitudinal bedplate (1), a base (2), a column (3) attached to the base (2), a secondary carriage or crosspiece (4) and an arm (5), in which the principal carriage or base (2) moves horizontally along the longitudinal bedplate (1), while the secondary carriage or crosspiece (4) can move vertically in relation to the column (3); and in which, also, the arm (5) can be moved horizontally in relation to the crosspiece (4), characterised in that it comprises a transport tool (6) configured as an auxiliary longitudinal bedplate placed adjacent to the principal bedplate (1), on which the base (2), the column (3) and the crosspiece (4) rest in the transport position.

2. Machine according to claim 1, which is configured with a Cartesian three axis system, in such a way that the secondary carriage (4) moves along the Z axis of the machine, while the arm (5) moves along the Y axis of the machine and the base (2) moves in relation to the machine's X axis; the movement of the machine's three axes are independent of each other.

3. Machine according to claim 1, in which the longitudinal bedplate (1) is the support along which the base (2) or principal carriage moves, comprising a number of inserts in bearing raceways, guide and bushing for level regulation; and in which the bedplate (1) comprises a number of connecting sleeves (8) in its side, which correspond to inserts (7) in the transport tool (6).

4. Machine according to claim 1, in which the principal carriage or base (2) comprises a base which slides along the principal bedplate (1) and a column (3) with bearing raceways attached to this column.

5. Machine according to claim 4, in which the principal carriage (2) has sets of axles with bearings which roll on the bearing raceways located on the upper part of the bedplate (1) and four sets of axes with bearings in the guide.

6. Machine according to claim 4, in which the reader head of the coordinate on the X axis is located at the rear of the base (2), while the optical scale for reading the coordinate of the Z axis is located on one of the sides of the column (3).

7. Machine according to claim 1, in which the secondary carriage or crosspiece (4) comprises a body which is mounted on the column (3) and which houses the arm (5) of the machine, allowing movement along the column (3) on the Z axis of the machine reference system; and in which the aforementioned movement of the crosspiece (4) is supported on bearings which move along bearing raceways close to the column (3).

8. Machine according to claim 7, in which the rear part of the crosspiece (4) is the location for the motorised system providing movement to the crosspiece (4) using a system of friction with a fixed axle and aided by a counterbalance, while the machine's Z axis reader head is inside the crosspiece (4).

9. Machine according to claim 1, in which the arm (5) provides the machine with movement on the Y axis when it moves inside the crosspiece (4) in which it is housed, in an orthogonal direction to the column (3) and the bedplate (1); and in which this movement is supported on bearings which move along bearing raceways which are close to the arm (5).

10. Machine according to claim 1, in which the end of the arm (5) has a laser sensor attached to it using a support piece.

* * * * *